United States Patent [19]

Nakanishi

[11] Patent Number: 5,009,688

[45] Date of Patent: Apr. 23, 1991

[54] PROCESS FOR PRODUCING POROUS GLASS

[75] Inventor: Kazuki Nakanishi, Hirakata, Japan

[73] Assignees: Asahi Glass Company, Ltd., Tokyo; Naohiro Soga, Kobe, both of Japan

[21] Appl. No.: 408,299

[22] Filed: Sep. 18, 1989

[30] Foreign Application Priority Data

Sep. 28, 1988 [JP] Japan ............................. 63-245532
Mar. 8, 1989 [JP] Japan ................................. 1-56886

[51] Int. Cl.$^5$ .................... C03B 19/09; C03B 20/00
[52] U.S. Cl. ................................. 65/18.3; 65/22; 65/901; 501/12
[58] Field of Search .................. 65/901, 18.1, 18.3, 65/22, 17; 501/12; 423/338

[56] References Cited

U.S. PATENT DOCUMENTS

| | | | |
|---|---|---|---|
| 4,059,658 | 11/1977 | Shoup et al. | 65/901 |
| 4,320,074 | 3/1982 | Birchall et al. | 264/63 |
| 4,731,264 | 3/1988 | Lin et al. | 528/20 |
| 4,765,818 | 8/1988 | Che et al. | 65/18.1 |
| 4,816,376 | 3/1989 | Toshida | 430/272 |
| 4,929,433 | 5/1990 | Hexemer et al. | 501/96 |

FOREIGN PATENT DOCUMENTS

| | | |
|---|---|---|
| 60-127373 | 7/1985 | Japan . |
| 61-402 | 1/1986 | Japan . |
| 61-232239 | 10/1986 | Japan . |
| 61-270225 | 11/1986 | Japan . |
| 62-123032 | 6/1987 | Japan . |
| 62-230628 | 10/1987 | Japan . |
| 61-260269 | 5/1988 | Japan . |
| 63-159804 | 7/1988 | Japan . |
| 63-225539 | 9/1988 | Japan . |
| 1-96057 | 4/1989 | Japan . |
| 1-119526 | 5/1989 | Japan . |

OTHER PUBLICATIONS

Yamane et al., Preparation of a Gel from Metal Alkoxide, 1978, Journal of Materials Science 13, (1978), 865–870.
Shoup, Controlled Pore Silica Bodies Gelled from Silica Sol-Alkali, 1976, Colloid and Interface Science, vol. 3, pp. 63–69.
Shafer et al. The Chemistry and Physics with Porous Sol-Gel Glasses, J. Appl. Phys. 61(12), 15 Jun. 1987, pp. 5438–5446.
Yamane et al., Low Temp. Synthesis of a Monolithic Silica Glass, Journal of Material Sciences 14 (1979), 607–611.
Lewis, Studies on Hydrolysis and Condensation of Silicon Alkoxides, Jun. 1983, Corporate Research Laboratories, 16–17.
Susa et al., New Optical Fibre Fabrication Method, Electronic Letters, Jun. 1982, vol. 18, No. 12, 499–500.
Chemical Abstracts, vol. 107, No. 16, Oct. 1987, p. 332, Abstract No. 139487k, E. Kato et al., "Manufacture of Porous Glass".
Patent Abstracts of Japan, vol. 13, No. 362 (C-625) [3710], Aug. 14, 1989 (Hitachi Chem. Co.) JP-A-11 19 523.
Patent Abstracts of Japan, vol. 13, No. 362 (C-625) [3710], Aug. 14, 1989 (Hitachi Chem. Co.), JP-A-11 19 526.
Patent Abstracts of Japan, vol. 13, No. 362 (C-625) [3710], Aug. 14, 1989 (Hitachi Chem. Co.), JP-A-11 19 528.
Patent Abstracts of Japan, vol. 13, No. 388 (C-630) [3736], Aug. 28, 1989 (Hitachi Chem. Co.), JP-A-11 38 135.
Journal of Non-Crystalline Solids, vol. 82, No. 1/3, Jun. 1986, pp. 210–219, D. Ravaine et al., "A New Family of Organically Modified Silicates Prepared from Gels".

Primary Examiner—Kenneth M. Schor
Assistant Examiner—John J. Bruckner
Attorney, Agent, or Firm—Oblon, Spivak, McClelland, Maier & Neustadt

[57] ABSTRACT

A process for producing porous glass, which comprises preparing a reaction solution containing a metal alkoxide or its oligomer and an organic polymer, hydrolyzing and polymerizing the metal alkoxide or its oligomer in the solution to obtain a gel, and calcining the gel to obtain porous glass, wherein the organic polymer has compatibility with the solution of the metal alkoxide or its oligomer, undergoes phase separation during the hydrolysis-polymerization step and is substantially free from formation of precipitates.

9 Claims, 1 Drawing Sheet

PROCESS FOR PRODUCING POROUS GLASS

The present invention relates to producing porous glass. More particularly, the present invention relates to a process for producing, by a sol-gel method, porous glass which is useful for a wide range of materials where fine pores of a submicron to micron order are required, such as a carrier for a catalyst, a carrier for enzymes and a material for a separating diaphragm.

Among conventional porous ceramics, those having very fine pore sizes of not larger than a submicron, are usually prepared by a method wherein borosilicate glass is heat-treated for phase separation to form an interlocking separate phase structure, and then one of the phases is eluted with an acid.

Whereas, those having pore sizes of at least a micron, are prepared by a method wherein a powder of ceramic material is calcinated and thermally decomposed to form pores in the powder particles or among the powder particles, followed by sintering under a suitable condition.

However, by these methods, it is difficult to produce porous ceramics having a uniform pore size within a range of from a submicron to a few tens microns. Further, these methods have a drawback that it is thereby difficult to produce a film-form or fiber-form product which may be required depending upon the application. Under these circumstances, it has recently been proposed to employ a sol-gel method for the preparation of porous ceramics, which employs a metal alkoxide as the starting material and which is capable of producing a ceramic product in a bulk, film or fiber form.

However, the pore diameter of a porous gel prepared by the above method which comprises hydrolyzing and polymerizing a silicon alkoxide in an organic solvent such as an alcohol for gelling the reaction solution system, followed by calcining the resulting porous gel, is extremely small at a level of not higher than a few tens nm. It has been attempted to conduct the hydrolysis with an addition of a large amount of hydrochloric acid to form pores of a micron order, but there is a problem that the pore size distribution tends to be broad.

Further, Japanese Unexamined Patent Publication No. 123032/1987 discloses a method for producing porous glass which comprises adding and mixing a polyvinyl acetate emulsion to a sol of silicon ethoxide for gelation, followed by calcining. However, this method has a difficulty that the pore size distribution of the porous glass thereby obtained is broad.

It is an object of the present invention to solve the above problems of the conventional techniques and to provide a process for producing porous ceramics with a pore diameter of a micron order and having a narrow pore size distribution.

The present invention provides a process for producing porous glass, which comprises preparing a reaction solution containing a metal alkoxide or its oligomer and an organic polymer, hydrolyzing and polymerizing the metal alkoxide or its oligomer in said solution to obtain a gel, and calcining the gel to obtain porous glass, wherein said organic polymer has compatibility with the solution of the metal alkoxide or its oligomer, undergoes phase separation during the hydrolysis-polymerization step and is substantially free from formation of precipitates.

BRIEF DESCRIPTION OF THE DRAWINGS

In the accompanying drawings.

Figure 1:
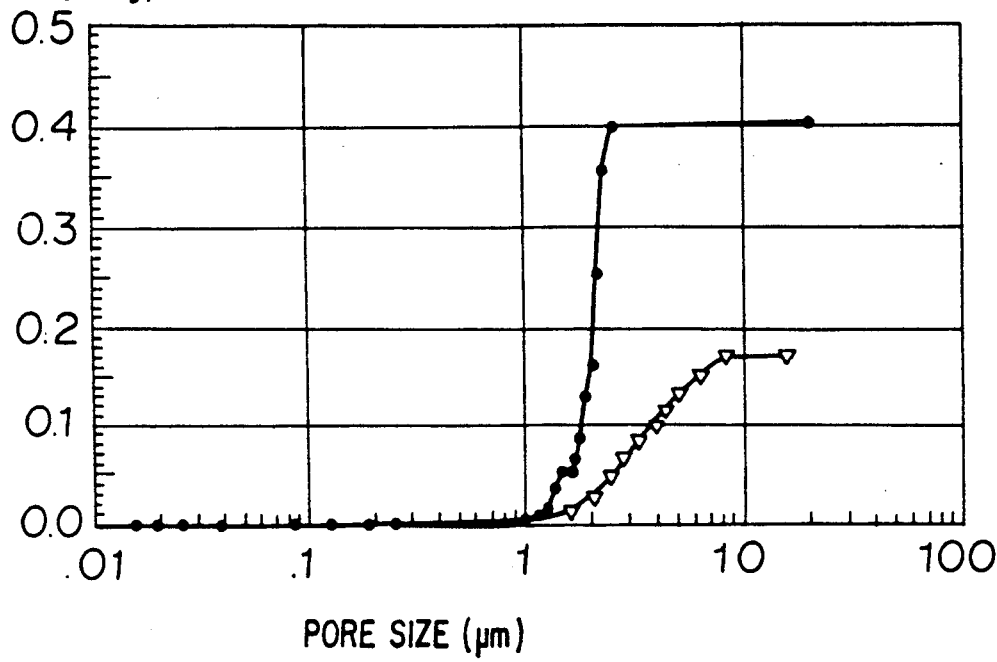
FIGS. 1 and 2 are graphs showing the pore size distributions.

Now, the present invention will be described in detail with reference to the preferred embodiments.

The present invention utilizes such a phenomenon that the uniformly dissolved organic polymer undergoes phase separation during the hydrolysis and polymerization of the metal alkoxide or its oligomer. Such an organic polymer has compatibility so that it is uniformly soluble in the solution formed by the hydrolysis of the metal alkoxide or its oligomer, undergoes phase separation during the polymerization and yet is substantially free from forming precipitates.

The organic polymer having such properties may be a water-soluble organic polymer capable of being formed into an aqueous solution having a suitable concentration, which is uniformly soluble in the alcohol-containing solution formed by the hydrolysis of the metal alkoxide or its oligomer. Specifically, the organic polymer may be a sodium salt of polystyrene sulfonic acid as a metal salt of a polymer, polyacrylic acid as a polymer acid capable of forming a polyanion when dissociated, polyallylamine and polyethylene-imine which are polymer bases capable of forming a polycation in an aqueous solution, or polyethylene oxide which is a neutral polymer having an ether bond on the main chain, or polyvinyl pyrrolidone having a $\gamma$-lactam on its side chain.

As the metal alkoxide or its oligomer, the one having a relatively small number of carbon atoms such as a methoxy group, an ethoxy group or a propoxy group, is preferred. As the metal thereof, a metal of the oxide to be finally formed, such as Si, Ti, Zr or Al, may be employed. Such metal may be one kind or a mixture of two or more different kinds. On the other hand, the oligomer may be the one capable of being uniformly dissolved in an alcohol. More specifically, the oligomer may be up to decamer. The organic polymer is used preferably in an amount of from 0.03 to 0.40 parts by weight per 1 part by weight of the metal alkoxide or its oligomer.

If the amount of the organic polymer exceeds the above range, there will be the following drawback. Namely, at the time of gelation, the silica ($SiO_2$) polymer phase tends to hardly form a continuous structure and is likely to precipitate in the form of particles. On the other hand, if the amount of the organic polymer is less than the above range, the organic polymer phase and the silica polymer phase tend to be hardly gelled in an interlocking fashion, whereby it will be difficult to obtain a porous body having continuous pores of uniform diameter. There is no particular restriction with respect to the manner of mixing the organic polymer with the metal alkoxide or its oligomer. However, such mixing may be conducted by dissolving the organic polymer in an aqueous acidic solution and stirring the solution with a metal alkoxide or its oligomer. Otherwise, an aqueous acidic solution and a metal alkoxide or its oligomer are first mixed, and then the organic polymer may be added thereto, or the organic polymer may be added after the partial promotion of the hydrolysis and polymerization of the metal alkoxide or its oligomer. The aqueous acidic solution to be used here is preferably an aqueous solution of a mineral acid such as hydrochloric acid or nitric acid having a concentration of at least 0.001N. In a case where tetraethoxysilane is used, porous glass having high strength may be obtained even when an aqueous solution containing no acid is used for hydrolysis. The hydrolysis can be conducted by putting such a solution into a closed container and maintaining it at a temperature of from 40° to 80° C. for from 0.5 to 5 hours. The hydrolysis proceeds in such a manner that the initially transparent solution becomes turbid, separates into silica-rich and organic polymer-rich phases and is finally gelled. During this hydrolysis, the organic polymer or its polymer is in a dispersed state and is substantially free from forming precipitates. The gelled product is left to stand at a temperature of from 40° to 60° C. for an appropriate period, usually from a few hours to a few tens hours for aging, then washed with water to remove the organic polymer, followed by calcining at a temperature of from 800° to 1,000° C. to obtain porous glass.

The porous stereostructure of the desired product of the present invention varies depending upon the temperature and pH of the reaction system, the molecular weight and the content of the organic polymer and other various conditions influential over the reactivity of the metal alkoxide or its oligomer and over the solubility of organic polymer. Accordingly, it is difficult to generally define the manner of control of the porous stereostructure. However, so long as the above-mentioned conditions are the same, the desired product having substantially the same structure such as the same pore size can be obtained with high reproducibility.

The porous gel formed as an intermediate product, may be used as it is. However, it swells in water and is poor in the mechanical strength, and therefore its use is rather limited. The above-mentioned porous gel can be converted to a $SiO_2$ type porous ceramics having improved mechanical strength when calcined. However, if the porous gel is calcined without removing the organic polymer, there will likely be a problem depending upon the kind of the organic polymer that the substance formed by the decomposition of the organic polymer prevents the vitrification of $SiO_2$.

The removal of the organic polymer from the porous gel formed as an intermediate product, can be conducted to some extent by washing the gel with water prior to the drying operation. However, it is advantageous that after the drying step, the gel is heated for a sufficiently long period of time until the organic polymer is decomposed or burnt, to completely remove the organic polymer.

Now, the present invention will be described in further detail with reference to Examples. However, it should be understood that the present invention is by no means restricted by such specific Examples.

EXAMPLE 1:

Polystyrene sulfonate is used as the organic polymer

Example 1-1

Firstly, sodium polystyrene sulfonate (product No. 24305-1, manufactured by Aldrich) as a metal salt of a polymer, was dissolved in 5.51 g of a 1N nitric acid aqueous solution to obtain a 20 wt % solution. To this solution, 5 ml of methanol was added to obtain a uniform solution. Then, 5 ml of tetramethoxysilane was dropwise added thereto over a period of about 1 minute, and the hydrolysis was conducted. After stirring for a few minutes, the resulting transparent solution was transferred to a closed container and maintained in a constant temperature tank at 40° C., whereby it was solidified in about 20 hours. The solidified sample was further aged for a few days, then dried at 60° C. and heated to 500° C. at a temperature-raising rate of 100° C./hr. The decomposition product of sodium polystyrene sulfonate was washed away with distilled water. Finally, the sample was subjected to heat treatment at 800° C. for 2 hours. In the porous silica glass thus obtained, uniform pores with a pore size of about 5 $\mu$m were present in an interlocking structure. The fine structure and the pore diameter of the sample dried at 60° C., were substantially the same as the porous silica glass after the heat treatment.

Example 1-2

The hydrolysis of tetramethoxysilane was conducted in the aqueous nitric acid solution of sodium polystyrene sulfonate in the same manner as in Example 1 except that 5 ml of methanol was not added. The subsequent solidifying condition was changed to 25° C. in 10 hours in the closed container, and the solidified sample was subjected to aging, drying, heating, washing and heat treatment under the same conditions as in Example 1-1, whereby the pore size of the porous glass was controlled to a level of about 1 $\mu$m.

Example 1-3

Sodium polystyrene sulfonate was dissolved in 5.51 g of a 1N nitric acid aqueous solution to obtain a 33 wt % solution. To this solution, 5 ml of methanol was added, and then 5 ml of tetramethoxysilane was dropwise added over a period of about 1 minute, and the hydrolysis was conducted. After stirring for a few minutes, the resulting transparent solution was transferred to a closed container and maintained in a constant temperature tank at 40° C., whereby it was solidified in about 20 hours. The solidified sample was subjected to aging, drying, heating, washing and heat treatment under the same conditions as in Example 1-1 to obtain porous silica glass having a structure of coagulated spherical particles of about 3 $\mu$m.

Example 1-4

Sodium polystyrene sulfonate having a definite molecular weight range (PS1; molecular weight: 10,000–30,000, manufactured by TOSOH CORPORATION) was dissolved in 5.51 g of a 1N nitric acid aqueous solution to obtain a 24.1 wt % solution. To this solution, 5 ml of tetramethoxysilane was dropwise added under stirring and the hydrolysis was conducted. After stirring for a few minutes, the resulting transparent solution was transferred to a closed container and maintained in a constant temperature tank at 40° C., whereby it was solidified in about 2 hours. The solidified sample was immersed in a 1N nitric acid aqueous solution to wash out sodium polystyrene sulfonate from the solidified sample, prior to drying. Then, the sample was dried at 60° C. to obtain a porous sample having a structure in which pores with a pore diameter of 100 $\mu$m are interlocked to one another. This sample was further heated to a temperature of 900° C. at a temperature raising rate of 100° C./hr to obtain porous silica glass having substantially the same structure.

Example 1-5

Sodium polystyrene sulfonate having a definite molecular weight range (PS1; molecular weight: 10,000–30,000, manufactured by TOSOH CORPORATION) was dissolved in 5.51 g of a 1N nitric acid aqueous solution to obtain a 25.0 wt % solution. To this solution, 5 ml of tetramethoxysilane was dropwise added under stirring, and the hydrolysis was conducted. After stirring for a few minutes, the resulting transparent solution was transferred to a closed container and maintained in a constant temperature tank at 60° C., whereby it was solidified in about 1 hour. The solidified sample was immersed in a 1N nitric acid aqueous solution to wash out sodium polystyrene sulfonate from the solidified sample, prior to drying. Then, the sample was dried at 60° C. to obtain a porous sample having a structure in which pores with a pore of 0.3 μm were interlocked to each other. Further, by increasing the concentration of sodium polystyrene sulfonate to 27.5 wt %, it was possible to control the pore size continuously up to about 20 μm. The dried sample was subjected to predetermined heat treatment to obtain porous silica glass having substantially the same structure.

Example 1-6

Sodium polystyrene sulfonate having a definite molecular weight range (PS5; molecular weight: 50,000–100,000, manufactured by TOSOH CORPORATION) was dissolved in 5.51 g of a 1N nitric acid aqueous solution to obtain a 19.1 wt % solution. To this solution, 5 ml of tetramethoxysilane was dropwise added under stirring, and the hydrolysis was conducted. After stirring for a few minutes, the resulting transparent solution was transferred to a closed container and maintained in a constant temperature tank at 40° C., whereby it was solidified in about 2 hours. The solidified sample was immersed in a 1N nitric acid aqueous solution to wash out sodium polystyrene sulfonate from the solidified sample, prior to drying. Then, the sample was dried at 60° C. to obtain a porous sample having a structure wherein pores with a pore diameter of about 50 μm are interlocked to one another. Further, by reducing the concentration of sodium polystyrene sulfonate to 16.6 wt %, it was possible to control the pore size continuously down to about 0.3 μm. Likewise, by increasing the amount of the 1N nitric acid aqueous solution to 6.17 g while fixing the amount of sodium polystyrene sulfonate, it was possible to control the pore size continuously to about 0.1 μm. The dried sample was subjected to prescribed heat treatment to obtain porous silica glass having substantially the same structure. Further, in FIG. 1, with respect to porous glass prepared from a solution comprising 1.20 g of sodium polystyrene sulfonate, 5.51 g of a 1N nitric acid aqueous solution and 5 ml of tetramethoxysilane, the distribution of pore sizes as measured by a mercury injection method, is shown by symbol ●.

Example 1-7

Sodium polystyrene sulfonate having a definate molecular weight range (PS5; molecular weight: 50,000–100,000, manufactured by TOSOH CORPORATION) was dissolved in 5.51 g of a 1N nitric acid aqueous solution to obtain a 19.1 wt % solution. To this solution, 5 ml of tetramethoxysilane was dropwise added under stirring, and the hydrolysis was conducted. After stirring for a few minutes, the resulting transparent solution was transfereed to a closed container and maintained in a constant temperature tank at 60° C., whereby it was solidified in about 1 hour. The solidified sample was immersed in a 1N nitric acid aqueous solution to wash out sodium polystyrene sulfonate from the solidified sample, prior to drying. Then, the sample was dried at 60° C. to obtain a porous sample having a structure wherein pores with a pore size of about 0.5 μm were interlocked to one another. Further, by increasing the concentration of sodium polystyrene sulfonate to 21.4 wt %, it was possible to control the pore size continuously up to about 20 μm. Likewise, by reducing the amount of the 1N nitric acid aqueous solution to 5.07 g while fixing the amount of sodium polystyrene sulfonate, it was possible to control the pore size continuously to about 20 μm. The dried sample was subjected to prescribed heat treatment to obtain porous silica glass having substantially the same structure.

Example 1-8

Sodium polystyrene sulfonate having a definite molecular weight range (PS50; molecular weight: 400,000–600,000, manufactured by TOSOH CORPORATION) was dissolved in 5.51 g of a 1N nitric acid aqueous solution to obtain a 14.0 wt % solution. To this solution, 5 ml of tetramethoxysilane was dropwise added under stirring, and the hydrolysis was conducted. After stirring for a few minutes, the resulting transparent solution was transferred to a closed container and maintained in a constant temperature tank at 40° C., whereby it was solidified in about 2 hours. The solidified sample was immersed in a 1N nitric acid aqueous solution to wash out sodium polystyrene sulfonate from the solidified sample, prior to drying. Then, the sample was dried at 60° C. to obtain a porous sample having a structure wherein pores with a pore size of about 0.3 μm were interlocked to one another. Further, when the concentration of sodium polystyrene sulfonate was changed to 13.2 wt %, and 1 ml of methanol was present during the reaction, the pore size became about 0.5 μm. The dried sample was subjected to a prescribed heat treatment to obtain porous silica glass having substantially the same structure.

Example 1-9

Sodium polystyrene sulfonate having a definite molecular weight range (PS5; molecular weight: 50,000–100,000, manufactured by TOSOH CORPORATION) was dissolved in 9.36 g of a 1N nitric acid aqueous solution to obtain a 11.4 wt % solution. To this solution, 7 ml of tetraethoxysilane was dropwise added under stirring, and the hydrolysis was conducted. After stirring for a few minutes, the resulting transparent solution was transferred to a closed container and maintained in a constant temperature tank at 60° C., whereby it was solidified in about 2 hours. The solidified sample was immersed in a 1N nitric acid aqueous solution to wash out sodium polystyrene sulfonate from the solidified sample, prior to drying. Then, the sample was dried at 60° C. to obtain a porous sample having a structure wherein pores with a pore size of about 2 μm were interlocked to one another. Further, by changing the concentration of sodium polystyrene sulfonate from 10.5 wt % to 11.8 wt %, it was possible to control the pore size continuously from about 0.3 μm to about 15 μm. Likewise, by changing the amount of the 1N nitric acid aqueous solution from 9.69 g to 9.09 g while fixing the amount of sodium polystyrene sulfonate, it was possible to control the pore size continuously from about 0.5 μm to about 50 μm. Further, by changing the reaction temperature from 40° C. to 80° C., it was possible to control the pore size from less than 1 μm to a few tens μm. The dried sample was subjected to prescribed heat treatment to obtain porous silica glass having substantially the same structure.

EXAMPLE 2:

Polyacrylic acid is used as the organic polymer

Example 2-1

Figure 2:
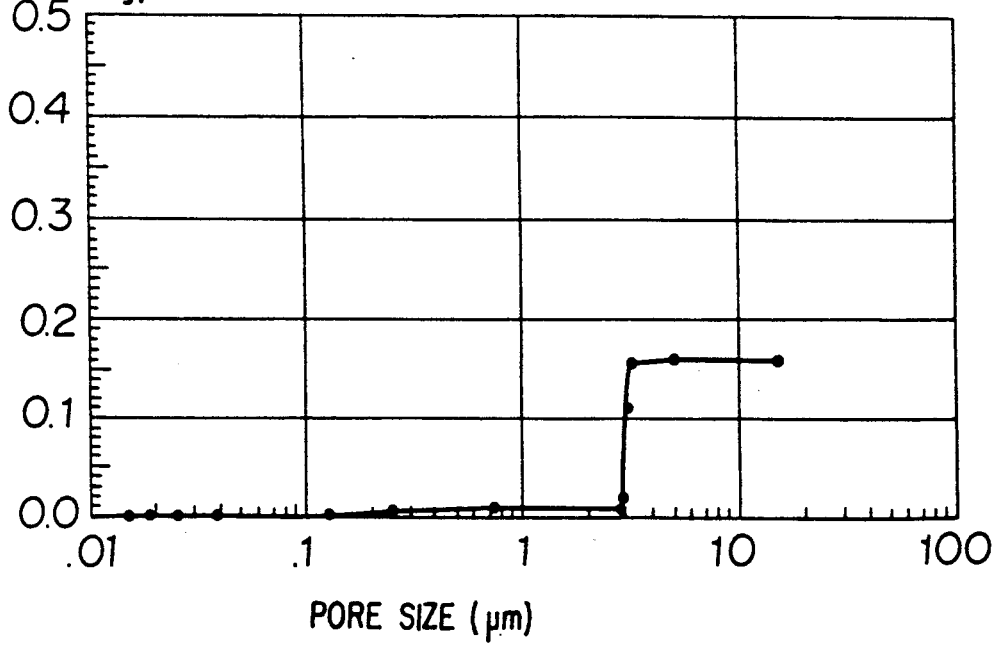

A 25 wt % aqueous solution of polyacrylic acid (product No. 19205-8, manufactured by Aldrich, molecular weight: 90,000) as a polymer acid, was diluted with distilled water to obtain a 7.4 wt % aqueous solution. To this solution, concentrated nitric acid was added to obtain a 1N nitric acid solution. To 5.91 g of this solution, 7 ml of tetraethoxysilane was added under stirring, and the hydrolysis was conducted. After a few minutes, the resulting transparent solution was transferred to a closed container and maintained in a constant temperature tank at 60° C., whereby it was solidified in about 2 hours. The solidified sample was further aged for a few hours and washed with distilled water and ethanol a few times and then dried at 60° C. In the dried sample, uniform pores having a pore size of about 3 μm were present in an interlocking fashion. In FIG. 2, the pore size distribution as measured by a mercury injection method is shown by symbol ●. By adding up to 5 ml of ethanol to the above reaction solution for solidification, it was possible to reduce the pore size of the resulting porous body continuously down to the minimum of about 0.5 μm. Further, by changing the amount of the 1N nitric acid aqueous solution from the minimum of 3.3 g to the maximum of 16.5 g, it was possible to control the pore size of the resulting porous body within a range of from the maximum of about 20 μm to the minimum of about 0.5 μm. Further, it was likewise possible to control the pore diameter by changing the concentration of the polyacrylic acid or the reaction temperature. The dried sample was heated to 900° C. at a temperature raising rate of 100° C./hr and maintained at this temperature for 2 hours to obtain porous silica glass having substantially the same structure.

Example 2-2

A 25 wt % aqueous solution of polyacrylic acid (product No. 19205-8, manufactured by Aldrich, molecular weight: 90,000) as a polymer acid, was diluted with distilled water to obtain a 7.4 wt % aqueous solution. Then, concentrated nitric acid was added thereto to obtain a 1N nitric acid solution. To this solution comprising 0.4 g of polyacrylic acid and 5.51 g of 1N nitric acid, 5 ml of tetramethoxysilane was added under stirring, and the hydrolysis was conducted. After a few minutes, the resulting transparent solution was transferred to a closed container and maintained in a constant temperature tank at 60° C., whereby it was solidified in about 2 hours. The solidified sample was further aged for a few hours, then washed with distilled water and ethanol a few times and dried at 60° C. In the dried sample, an interlocking structure was present which comprises a skeleton having a size of about 300 μm and fine pores within the skeleton. When methanol was added in an amount of up to 5 ml to the above reaction solution for solidification, the pore size of the resulting porous body tended to be small, and it was possible to control the pore size continuously down to the minimum of about 10 μm. Further, by increasing the amount of the 1N nitric acid aqueous solution up to 11 g without adding methanol, it was possible to control the pore size continuously to the minimum of about 30 μm. The dried sample was subjected to prescribed heat treatment to obtain porous silica glass having substantially the same structure.

Example 2-3

Firstly, polyacrylic acid (product No. 18128-5, manufactured by Aldrich; molecular weight: 250,000) as a polymer acid, was dissolved in 5.51 g of a 1N nitric acid aqueous solution to obtain 3.50 wt % solution. To this solution, 7 ml of tetraethoxysilane was added under stirring, and the hydrolysis was conducted. After a few minutes, the resulting transparent solution was transferred to a closed container and maintained in a constant temperature tank at 80° C., whereby it was solidified in about 1 hour. The solidified sample was further aged for a few hours, then washed with distilled water and ethanol a few times and dried at 60° C. In the dried sample, an interlocking structure was present which comprises a skeleton having a size of about 30 μm and fine pores in the skeleton. When ethanol was added up to 5 ml to the above reaction solution, it was possible to reduce the pore size of the resulting porous body and to control the pore size continuously to the minimum of about 10 μm. Further, by increasing the amount of the 1N nitric acid aqueous solution up to 11 g without adding ethanol, it was possible to control the pore size continuously to the minimum of about 10 μm. Furthermore, it was likewise possible to control the pore size by changing the concentration of the polyacrylic acid or the reaction temperature. The dried sample was subjected to prescribed heat treatment to obtain porous silica glass having substantially the same structure.

Example 2-4

Firstly, polyacrylic acid (product No. 18128-5, manufactured by Aldrich; molecular weight: 250,000) as a polymer acid, was dissolved in 5.0 g of distilled water to obtain a 7.4 wt % solution. To this solution, 5 ml of tetramethoxysilane was added under stirring without addition of an acid as a hydrolyzing catalyst, and the hydrolysis was conducted. After a few minutes, the resulting transparent solution was transferred to a closed container and maintained in a constant temperature tank at 60° C., whereby it was solidified in about 1 hour. The solidified sample was further aged for a few hours, then washed with distilled water and ethanol a few times and dried at 60° C. In the dried sample, pores having a uniform size of about 0.5 μm were present in an interlocking structure. When methanol was added up to 2 ml to the above reaction solution for solidification, it was possible to reduce the pore size of the resulting porous body and to control the pore size continuously to the minimum of about 0.2 μm. Further, by changing the amount of distilled water from the minimum of 4.0 g to the maximum of 6.0 g without adding methanol, it was possible to continuously control the pore size from the maximum of 5 μm to the minimum of 0.1 μm. Further, it was likewise possible to control the pore size by changing the concentration of polyacrylic acid and the reaction temperature. The dried sample was subjected to prescribed heat treatment to obtain porous silica glass having substantially the same structure.

Example 2-5

Firstly, polyacrylic acid (product No. 18128-5, manufactured by Aldrich; molecular weight: 250,000) as a polymer acid, was dissolved in 5.51 g of a 1N nitric acid aqueous solution to obtain 3.50 wt % solution. To this solution, 5.15 g of tetramethoxysilane and 0.515 g of titanium tetrabutoxide (butyl orthotitanate) previously mixed and dissolved, were added under stirring, and the hydrolysis was conducted. After a few minutes, the resulting transparent solution was transferred to a closed container and maintained in a constant temperature tank at 40° C., whereby it was solidified in about 1 hour. The solidified sample was further aged for a few hours, then washed with 1N nitric acid and ethanol a few times and dried at 60° C. In the dried sample, uniform pores having a pore size of about 1 μm were present in an interlocking structure. The dried sample was further heated at a temperature raising rate of 100° C./hr and maintained at 800° C. for 1 hour to obtain porous silica-titania glass having substantially the same structure, wherein no precipitation of fine crystals was observed by the X-ray diffraction.

EXAMPLE 3:

Polyethyleneoxide (polyethylene glycol) is used as the organic polymer

Example 3-1

Firstly, polyethyleneoxide (product No. 18198-6, manufactured by Aldrich; molecular weight: 100,000) as a neutral polymer, was dissolved in 6.61 g of a 1N nitric acid aqueous solution to obtain a 13.1 wt % solution. To this solution, 7 ml of tetraethoxysilane was added under stirring, and the hydrolysis was conducted. After a few minutes, the resulting transparent solution was transferred to a closed container and maintained in a constant temperature tank at 40° C., whereby it was solidified in about 8 hours. The solidified sample was further aged for a few hours, then washed with distilled water and ethanol a few times and dried at 60° C. In the dried sample, uniform pores with a pore size of about 3 μm were present in an interlocking structure. When the concentration of the polyethylene glycol in the above reaction solution was changed from the minimum of 12.6 wt % to the maximum of 14.3 wt %, it was possible to control the pore size continuously from the maximum of 6 μm to the minimum of 0.5 μm. Further, it was likewise possible to control the pore size by changing the concentration of the 1N nitric acid aqueous solution and the ethanol or the reaction temperature. The dried sample was heated to 900° C. at a temperature raising rate of 100° C./hr and held at this temperature for 2 hours to obtain porous silica glass having substantially the same structure.

Example 3-2

Firstly, polyethyleneoxide (product No. 18199-4, manufactured by Aldrich; molecular weight: 200,000) as a neutral polymer, was dissolved in 6.61 g of a 1N nitric acid aqueous solution to obtain a 13.1 wt % solution. To this solution, 7 ml of tetraethoxysilane was added under stirring, and the hydrolysis was conducted. After a few minutes, the resulting transparent solution was transferred to a closed container and maintained in a constant temperature tank at 40° C., whereby it was solidified in about 8 hours. The solidified sample was further aged for a few hours, then washed with distilled water and ethanol a few times and dried at 60° C. In the dried sample, uniform pores with a pore size of about 1 μm were present in an interlocking structure. It was likewise possible to control the pore size by changing the reaction temperature or the concentrations of the polyethylene oxide, the 1N nitric acid aqueous solution and the ethanol in the reaction solution. The dried sample was subjected to prescribed heat treatment to obtain porous silica glass having substantially the same structure.

Example 3-3

Firstly, polyethylene glycol (product No. 16812221, manufactured by Wako Junyaku Kogyo K.K.; molecular weight 40,000-60,000) as a neutral polymer, was dissolved in 6.61 g of a 1N nitric acid aqueous solution to obtain a 12.6 wt % solution. To this solution, 7 ml of tetraethoxysilane was added under stirring, and the hydrolysis was conducted. After a few minutes, the resulting transparent solution was transferred to a closed container and maintained in a constant temperature tank at 40° C., whereby it was solidified in about 8 hours. The solidified sample was further aged for a few hours, then washed with distilled water and ethanol a few times and dried at 60° C. In the dried sample, uniform pores with a pore size of about 2 μm were present in an interlocking structure. It was likewise possible to control the pore size by changing the reaction temperature or the concentrations of the polyethylene glycol, the 1N nitric acid aqueous solution and the ethanol in the reaction solution. The dried sample was subjected to prescribed heat treatment to obtain porous silica glass having substantially the same structure.

Example 3-4

Firstly, polyethylene glycol (molecular weight: 20,000, manufactured by Hayashi Junyaku Kogyo K.K.) as a neutral polymer, was dissolved in 6.61 g of a 1N nitric acid aqueous solution to obtain a 12.0 wt % aqueous solution. To this solution, 7 ml of tetraethoxysilane was added under stirring, and the hydrolysis was conducted. After a few minutes, the resulting transparent solution was transferred to a closed container and maintained in a constant temperature tank at 40° C., whereby it was solidified in about 8 hours. The solidified sample was further aged for a few tens hours, then washed with distilled water and ethanol a few times and dried at 60° C. In the dried sample, uniform pores with a pore size of about 1 μm were present in an interlocking structure. It was likewise possible to control the pore size by changing the reaction temperature or the concentrations of the polyethylene glycol, the 1N nitric acid aqueous solution and the ethanol in the reaction solution. The dried sample was subjected to prescribed heat treatment to obtain porous silica glass having substantially the same structure.

Example 3-5

Firstly, polyethylene glycol (molecular weight: 6,000, manufactured by Hayashi Junyaku Kogyo K.K.) as a neutral polymer, was dissolved in 6.61 g of a 1N nitric acid aqueous solution to obtain a 7.03 wt % aqueous solution. To this solution, 7 ml of tetraethoxysilane was added under stirring, and the hydrolysis was conducted. After a few minutes, the resulting transparent solution was transferred to a closed container and maintained in a constant temperature tank at 40° C., whereby it was solidified in about 8 hours. The solidified sample was further aged for a few tens hours, then washed with distilled water and ethanol a few times and dried at 60° C. In the dried sample, uniform pores with a pore size of about 1 μm were present in an interlocking structure. It was likewise possible to control the pore size by changing the reaction temperature or the concentrations of the polyethylene glycol, the 1N nitric acid aqueous solution and the ethanol in the reaction solution. The dried sample was subjected to prescribed heat treatment to obtain porous silica glass having substantially the same structure.

EXAMPLE 4:

Polyvinyl pyrrolidone is used as the organic polymer

Example 4-1

Firstly, polyvinyl pyrrolidone (product No. 85645-2, manufactured by Aldrich; molecular weight: 10,000) as a neutral polymer, was dissolved in 5.51 g of a 1N nitric acid aqueous solution to obtain a 21.4 wt % solution. To this solution, 5 ml of tetramethoxysilane was added under stirring, and the hydrolysis was conducted. After a few minutes, the resulting transparent solution was transferred to a closed container and maintained in a constant temperature tank at 60° C., whereby it was solidified in about 1 hour. The solidified sample was further aged for a few tens hours, then washed with distilled water and ethanol a few times and dried at 60° C. In the dried sample, uniform pores with a pore size of about 3 μm were present in an interlocking structure. It was likewise possible to obtain porous bodies having different pore sizes by changing the reaction temperature or the concentration of the polymer in the reaction solution. The dried sample was heated to 900° C. at a temperature raising rate of 100° C./hr and maintained at this temperature for 2 hours to obtain porous silica glass having substantially the same structure.

Example 4-2

Firstly, polyvinyl pyrrolidone (product No. 85656-8, manufactured by Aldrich; molecular weight: 40,000) as a neutral polymer, was dissolved in 5.0 g of distilled water to obtain a 23.1 wt % solution. To this solution, 5 ml of tetramethoxysilane was added under stirring, and the hydrolysis was conducted. After a few minutes, the resulting transparent solution was transferred to a closed container and maintained in a constant temperature tank at 60° C., whereby it was solidified in about 30 minutes. The solidified sample was further aged for a few hours, then washed with distilled water and ethanol for a few times and dried at 60° C. In this sample, uniform pores with a pore size of about 0.2 μm were present in an interlocking structure. It was possible to obtain porous bodies having different pore sizes by changing the reaction temperature or the concentration of the polymer in the reaction solution. The dried sample was subjected to prescribed heat treatment to obtain porous silica glass having substantially the same structure.

EXAMPLE 5:

Polyallylamine is used as the organic polymer

Example 5-1

Firstly, a hydrochloride of polyallylamine (PAA-HCL-L manufactured by Nitto Boseki; molecular weight: 8,000-11,000) having only a primary amine on its side chain, was dissolved in 10.51 g of a 0.5N nitric acid aqueous solution to obtain a 11.8 wt % solution. To this solution, 5 ml of tetramethoxysilane was added under stirring, and the hydrolysis was conducted. After a few minutes, the resulting transparent solution was transferred to a closed container and maintained in a constant temperature tank at 40° C., whereby it was solidified in about 2 hours. The solidified sample was further aged for a few hours, then washed with distilled water and ethanol a few times and dried at 60° C. In the dried sample, uniform pores with a pore size of about 3 μm were present in an interlocking structure. It was possible to obtain porous bodies having different pore sizes by changing the reaction temperature or the concentration of the polymer in the reaction solution. The dried sample was heated to 900° C. at a temperature raising rate of 100° C./hr and maintained at this temperature for 2 hours to obtain porous silica glass having substantially the same structure.

Example 5-2

Firstly, a hydrochloride of polyallylamine (PAA-HCL-H manufactured by Nitto Boseki; molecular weight: 50,000-65,000) having only a primary amine on its side chain, was dissolved in 10.51 g of a 0.5N nitric acid aqueous solution to obtain a 3.67 wt % solution. To this solution, 5 ml of tetramethoxysilane was added under stirring, and the hydrolysis was conducted. After a few minutes, the resulting transparent solution was transferred to a closed container and maintained in a constant temperature tank at 60° C., whereby it was solidified in about 1 hour. The solidified sample was further aged for a few hours, then washed with distilled water and ethanol a few times and dried at 60° C. In the dried sample, uniform pores with a pore size of about 0.5 μm were present in an interlocking structure. It was possible to obtain porous bodies having different pore sizes by changing the reaction temperature or the concentration of the polymer in the reaction solution. The dried sample was subjected to prescribed heat treatment to obtain porous silica glass having substantially the same structure.

EXAMPLE 6:

Polyethylene-imine is used as the organic polymer

Example 6-1

Firstly, a 50 wt % aqueous solution of polyethylene-imine having a nitrogen atom on the main chain (product No. 18197 8, manufactured by Aldrich) was diluted to a 20 wt % solution. To 6.25 g of this solution, 2.54 g (62 wt %) of concentrated nitric acid and 1 ml of water were added to obtain a uniform solution. To this solution, 3 ml of tetramethoxysilane was added under stirring, and the hydrolysis was conducted. After a few minutes, the resulting transparent solution was transferred to a closed container and maintained in a high temperature tank at 60° C., whereby it was solidified in about 2 hours. The solidified sample was further aged for a few hours, then washed with distilled water and ethanol a few times and dried at 60° C. In the dried sample, uniform pores with a pore size of about 0.1 μm were present in an interlocking structure. It was possible to obtain porous bodies having different pore sizes by changing the reaction temperature and the concentration of the polymer in the reaction solution. The dried sample was subjected to prescribed heat treatment to obtain porous silica glass having substantially the same structure.

In the above Examples, the starting material was a tetraalkoxysilane, whereby porous silica glass was obtained. Various $SiO_2$ type porous ceramics can be obtained in the similar manner by using starting materials having small amounts of other metal alkoxides added to the tetraalkoxysilanes. Further, similar porous ceramics may be obtained even when the temperature raising rate or the maximum heating temperature is changed to some extent.

COMPARATIVE EXAMPLE

To 250 ml of tetraethoxysilane, 200 ml of 0.01N hydrochloric acid was added and stirred. Then, from 10 to 50 wt % of a polyvinyl acetate emulsion was added and dispersed thereto. Then, ammonia was added thereto, and the pH value was adjusted to a level of from 3.5 to 6.6. The mixture was then introduced into a closed container and left to stand at a temperature of from 20° to 30° C. for gelation. Then, the gel thereby obtained was calcined to obtain porous glass. The pore size of this porous glass was measured, and the results were plotted and indicated by symbol ▽ in FIG. 1. As is evident from the Figure, this porous glass had a wide range of pore size distribution.

According to the present invention, porous ceramics having uniform pore sizes within a range of from a submicron to a few tens microns, can readily be provided.

What is claimed is:

1. A process for producing porous glass, which comprises preparing a reaction solution containing a metal alkoxide or partially polymerized metal alkoxide and an organic polymer, hydrolyzing and polymerizing the metal alkoxide or partially polymerized metal alkoxide in said solution to obtain a gel, and calcining the gel to obtain porous glass, wherein said organic polymer is uniformly soluble with the solution of the metal alkoxide or partially polymerized metal alkoxide, undergoes continuous interlocking phase separation during the hydrolysis-polymerizing step and is substantially free from formation of precipitates, wherein the organic polymer is selected from the group consisting of sodium polystyrene sulfonate, polyacrylic acid, polyallylamine, polyethylene-imine, polyethylene oxide and polyvinyl pyrrolidone.

2. The process according to claim 1, wherein the metal alkoxide is selected from the group consisting of a methoxide, ethoxide and propoxide of at least one metal selected from the group consisting of Si, Ti, Zr and Al.

3. The process according to claim 1, wherein the metal alkoxide is a tetraalkoxysilane.

4. The process according to claim 1, wherein the metal alkoxide is tetramethoxysilane or tetraethoxysilane.

5. The process according to claim 1, wherein the organic polymer is used in an amount of from 0.03 to 0.40 parts by weight per 1 part of the metal alkoxide or partially polymerized metal alkoxide.

6. The process according to claim 1, wherein the reaction solution is an aqueous acidic solution.

7. The process according to claim 1, wherein the reaction solution is an aqueous acidic solution of at least 0.001N of a mineral acid.

8. The process according to claim 1, wherein the hydrolysis is conducted at a temperature of from 40° to 60° C. for from 0.5 to 5 hours.

9. The process according to claim 1, wherein the calcination is conducted at a temperature of from 800° to 1,000° C.

* * * * *